United States Patent [19]

Hibbard

[11] Patent Number: 4,466,021
[45] Date of Patent: Aug. 14, 1984

[54] ELECTRONIC CAMERA

[75] Inventor: Earl R. Hibbard, Berkeley, Calif.

[73] Assignee: Terminal Data Corporation, Woodland Hills, Calif.

[21] Appl. No.: 420,680

[22] Filed: Sep. 21, 1982

[51] Int. Cl.³ .............................................. H04N 1/12
[52] U.S. Cl. .................................. 358/293; 358/285; 358/294
[58] Field of Search ................ 358/293, 294, 285, 106

[56] References Cited

U.S. PATENT DOCUMENTS

| | | | |
|---|---|---|---|
| 3,995,107 | 11/1976 | Woywood | 358/213 |
| 4,318,135 | 3/1982 | Allis | 358/294 |
| 4,325,086 | 4/1982 | Sato | 358/294 |
| 4,358,794 | 11/1982 | Kurakami | 358/293 |
| 4,394,683 | 7/1983 | Liptay-Wagner | 358/106 |

Primary Examiner—Howard W. Britton
Attorney, Agent, or Firm—Harry R. Lubcke

[57] ABSTRACT

An electronic camera for producing a video signal corresponding to a document or the like that is moved past a linear array of CCD sensors (1). The camera output is indicated as valid only when a document is being scanned with a predetermined number of lines determined by a counter (47-49). A time delay is invoked between documents to prevent fragmentary scanning. A pulse amplifier (20-24) having a wide frequency band and very low impedance drives the CCD sensors at a high rate.

10 Claims, 3 Drawing Figures

ELECTRONIC CAMERA

DESCRIPTION

1. Technical Field

This invention pertains to a wholly electronic camera, particularly one that scans one frame of an image, at a time.

2. Background Art

U.S. Pat. No. 3,995,107 discloses a camera-like device that employs a linear array of photodetectors, across which the scene to be scanned is moved. Analog signals therefrom are fed into charge-coupled-device (CCD) shift registers. The line signals thus stored in the CCD registers are subsequently clocked-out in line-after-line serial sequence, and are applied to a television-type display device.

Digital signals are not utilized.

DISCLOSURE OF INVENTION

The method is for intermittently actuating a television-like camera for typically scanning a moving document. After enablement, upon the camera optically sensing white on the document, a counter is started. After a predetermined number of counts, sufficient to scan one document, the scanning process is complete.

A time-delay is then invoked to prevent the beginning of the next camera scan until a bona-fide successive document is presented for scanning.

The camera employes a linearly configured charge-coupled photoelectric device (CCD). A pulse buffer amplifier having a wide frequency band and very low output impedance is required to cause the CCD device to scan at a high rate. High definition video signals result, which are converted to digital form.

BEST MODE FOR CARRYING OUT THE INVENTION

Figure 1:
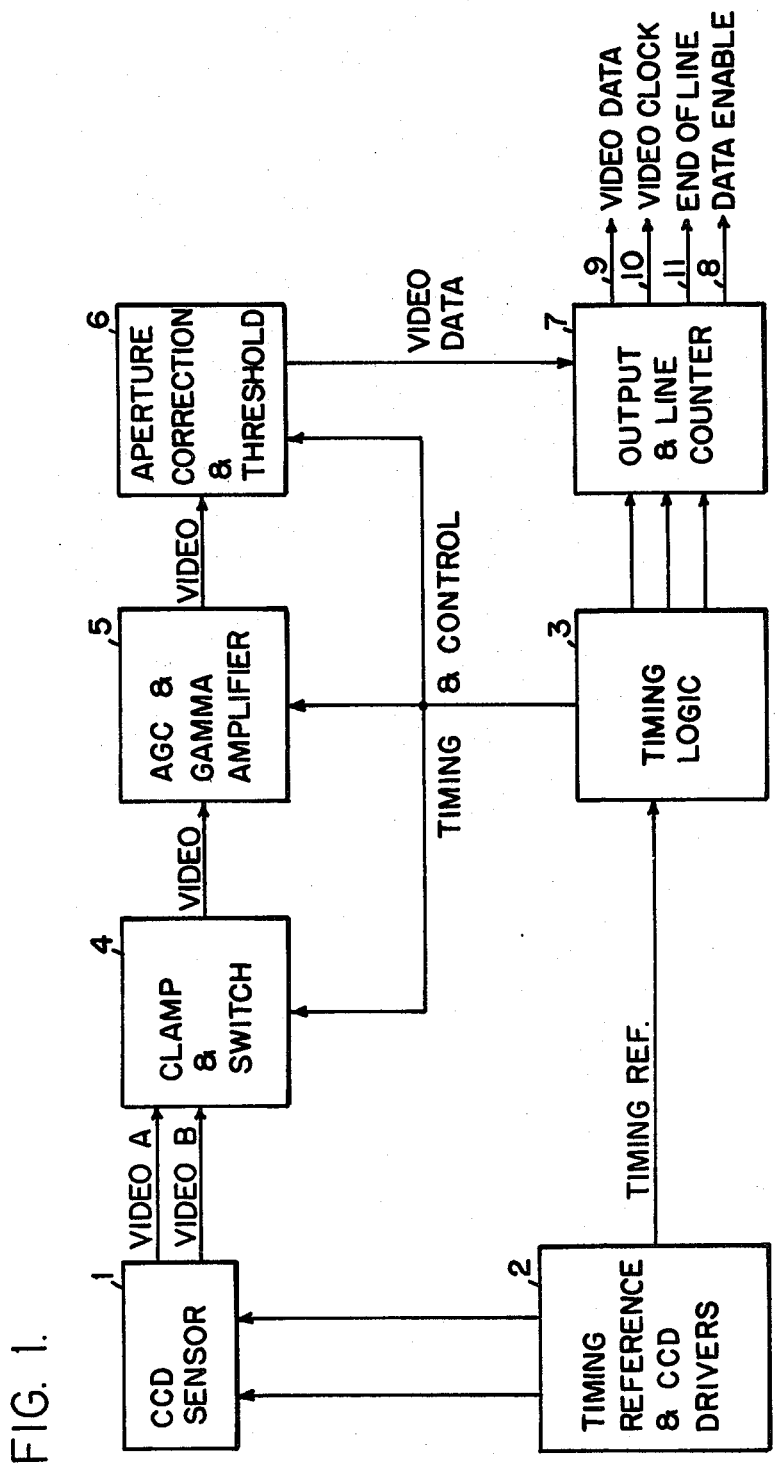
FIG. 1 is a block diagram of the camera according to this invention.

In FIG. 1, numeral 1 identifies a linearly configured charge-coupled photoelectric device; i.e., a "CCD", which may be the Type CCD 143 manufactured by Fairchild. The device utilizes charge-coupled device n-channel isoplanar buried-channel technology.

As is known, the CCD device provides an electrical output on two channels, video A and video B. It is driven from the timing reference and CCD drivers block 2. The circuits therein are detailed in FIG. 2.

Timing logic block 3 is supplied with timing reference from originating block 2.

Clamp and switch block 4 clamps the video A and video B signals to a d.c. reference level and multiplexes the two into one video channel.

AGC and gamma amplifier block 5 amplifies the video signal to a constant level and provides an amplitude level characteristic that compensates for the gamma exposure characteristic of the film used.

Aperture correction and threshold block 6 contains an aperture correction circuit, which may be of the usual type that increases the steepness of transitions in amplitude. The threshold circuit cancels out unwanted background signals.

The typical document is comprised of black printing or writing upon white paper. The threshold circuit distinguishes between the black printing or writing and the background. That result is fed to an analog to digital converter in block 6, and the output therefrom is digital video data.

These data enter output and line counter block 7 along with other information from timing logic block 3 to the four outputs from block 7.

A data enable signal, output 8, is produced in block 7 from the inputs thereto. The top edge of a document is sensed to initiate this signal. It is used by a video monitor, or other subsequent equipment that is not a part of this invention, and is not shown, to reproduce the document. The CCD sensor of block 1 operates continuously. The desired document video data, output 9, is indicated to the subsequent equipment by the presence of a "true" data enable signal.

As typically embodied, the output remains "true" for 2200 lines, which embraces an 11 inch (28 centimeters; cms) long document. Each line typically contains 1728 pixels (picture elements) in an 8½ inch (21.5 cm) width of the document.

Video clock output 10 is generated in timing reference and CCD drivers block 2 and transferred from block 3 to block 7.

End of line output 11 is generated in block 3 and immediately follows the last pixel of each scan line. It is "true" until the start of the first pixel of the next scan line. It may be considered similar to the horizontal blanking pulse in television video operations.

Connections out of timing logic block 3 provide timing and control for previously described blocks 4, 5 and 6. A pair of connections from block 2 to block 1 represent the two separate driving pulses required for the photoelectric sensor.

Figure 2:
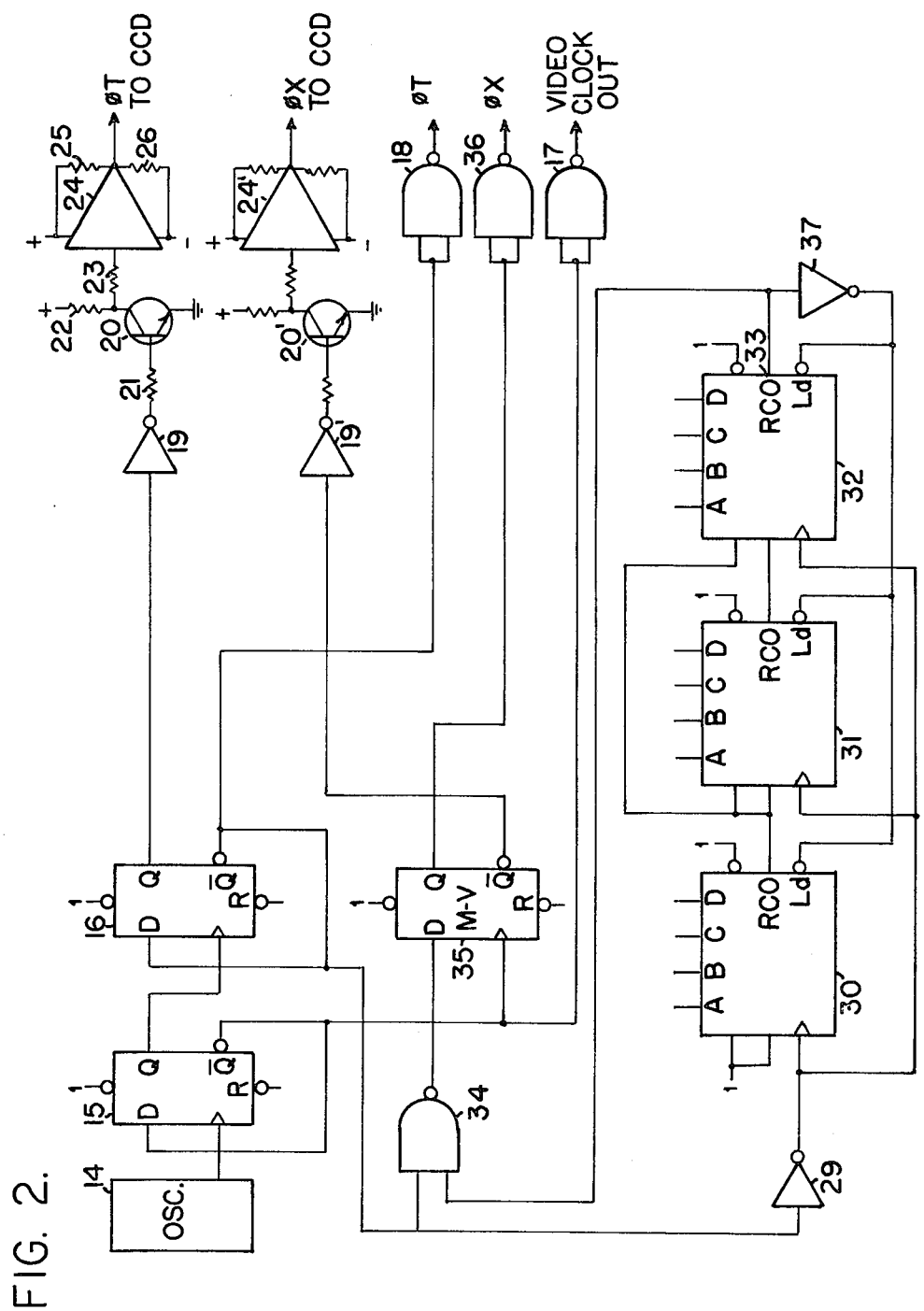
FIG. 2 is a schematic diagram of the timing and driver circuits for the CCD device.

FIG. 2 gives the detailed schematic diagram of the apparatus within block 2 of FIG. 1.

In FIG. 2, element 14 is a solid-state electrical oscillator, typically of square waveform output and having an operating frequency of 18 megahertz (Mhz). Frequency divider 15 is connected to oscillator 14 for the purpose of reducing the frequency to one-half; i.e., to 9 Mhz. Divider 15 may be a 74LS74.

The Q output thereof is connected to the clock input of a similar divider 16. The Q output thereof is again at half frequency; i.e., 4½ Mhz.

The $\overline{Q}$ output of first divider 15, at 9 Mhz, becomes the video clock output. It passes through both inputs of NAND gate 17 to give an isolated output for use elsewhere in the whole circuit. The $\overline{Q}$ output of second divider 16 becomes the $\phi T$ output after passing through NAND gate 18. Both of these gates may be type 74LS37. The $\phi T$ output is used in clamp and switch block 4 to multiplex the two channels of the CCD together.

The Q output of divider 16, $\phi T$, is fed to inverter 19, which may be one section of a 74SO4 device and therethrough to the base of npn transistor 20, through isolation resistor 21, which may have a resistance of 270 ohms. Resistor 21 protects inverter 19 by limiting the current therefrom when transistor 20 is conducting.

Transistor 20 is a very fast transistor, type 2N5772, having short rise and fall times, a product of Fairchild. The emitter is tied to ground. The collector is connected to resistor 22, of 510 ohms nominal, which resistor is also connected to a d.c. power supply voltage of +12 volts.

This transistor is turned completely ON and completely OFF between and during pulses, respectively. This establishes the d.c. voltage limits of this pulse buffer amplifier assembly output.

Pulse buffer amplifier 24 may be a type LH0033. The input is connected to the collector of transistor 20 through resistor 23 for isolation, of 47 ohms. The input of the type LH0033 amplifier has plural field-effect transistors and a "totem-pole" complementary emitter-collector output stage.

Resistors 25 and 26, at the output, limit the output of the amplifier to safe operating values. Each have a nominal resistance of 47 ohms. Resistor 25 is also connected to the +15 volt d.c. power supply to the amplifier, and resistor 26 is also connected to the −5 volt d.c. power supply to the amplifier.

The pulse buffer amplifier has a gain of approximately one. It is essentially an impedance matching device; it transforms the impedance of the collector circuit of transistor 20, approximately 500 ohms, to an output impedance of amplifier 24 of approximately 2 ohms. This low impedance is required because the capacitance of the CCD sensor at the $\phi T$ connection of the output of amplifier 24 is approximately 700 pf. and the frequency range of the waveform extends to approximately 70 Mhz. The data rate of the desired video output extends to approximately 20 Mhz.

A second equivalent assembly of a pulse buffer amplifier is identified by beginning numeral 19' and ending numeral 24' and is provided to drive the CCD sensor at the $\phi X$ connection. The capacitance there is approximately 300 pf. and the frequency range is the same, 70 Mhz.

The counter strip 30, 31, and 32 in FIG. 2, may each be a 74LS161 counter unit. It is fed with one-fourth of the oscillator frequency from the $\overline{Q}$ output of frequency divider 16 through inverting amplifier 29, which may be a 74SO4 type. These counters are typically set for a count of 1050 and are for each scan line. This is the same as 2100 clock pulses insofar as timing is concerned. This clocking actuates the 2048 element line of light-sensitive cells of CCD sensor 1.

The output of counter unit 32, at 33, becomes one nput of NAND gate 34, the other input coming from the $\overline{Q}$ output of frequency divider 16. When these inputs are "true" an output from gate 34 passes to the D input of 74LS74 multivibrator 35. The output thereof is a single pulse that occurs once every 2100 clock pulses. This is fed from the $\overline{Q}$ terminal to the input of inverter 19'. From there the processing is the same as previously set forth for elements 19 through 24.

However, the output from pulse buffer amplifier 24' is $\phi X$, also used to drive CCD sensor 1.

Every time the single pulse referred to above occurs, the sensor clears itself and starts scanning the output of its photo-sensors. The $\phi X$ is a basic timing pulse for the whole camera circuit. The opposite polarity of the same appears at the Q output of multivibrator 35 and is fed through NAND gate 36 to the scan line counter circuits of FIG. 3.

In the counter section, inverter 37 receives the pulse at the end of 1050 counts and passes it back to the load (Ld) terminal of each counting unit for resetting the same.

Figure 3:
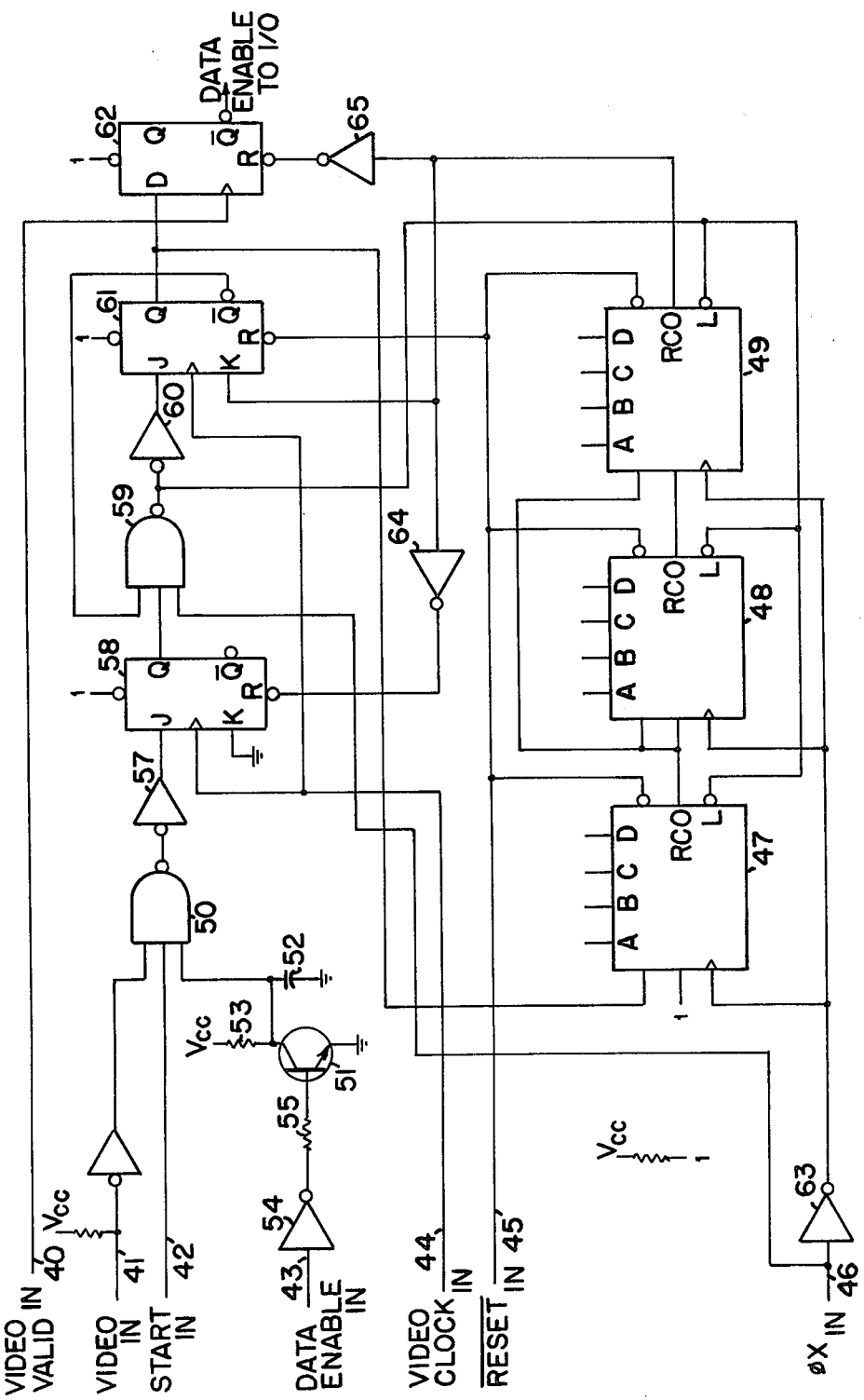
FIG. 3 is a schematic diagram of the scan line counter and the time-delay circuit.

FIG. 3 details the scan line counter and the time-delay circuit. The purpose of the counter and circuit is to initiate a "data-enable" output to equipment external to the camera to inform such equipment that the camera is scanning a document and that the output data are valid. As typically set up the counter counts 2200 horizontal scan lines, which comprise a complete image.

Several inputs to these circuits are required to validate the "data-enable" output.

"Video valid in", entered at conductor 40, is the inverted polarity of the end-of-line signal from timing logic 3 of FIG. 1. This gives a pulse at the end of every scanning line.

The next input is "video in", at 41, which is detected from the start of video from CCD sensor 1 of FIG. 1. This means that the sensor is seeing white; i.e., the beginning of a document. This is one of the necessary conditions to start the scanning process in a document-meaningful manner.

The next input is "start in", at 42. This comes from the external equipment and signifies that it is ready to receive the video data.

The next input, "data enable in", at 43, is actually tied in around from the output of the circuitry of FIG. 3. This is to prevent the counter from being re-started while an image is already being scanned.

"Video clock in" input, at 44, comes from the timing reference 2 and the CCD circuitry of FIG. 1. It serves as a clock for some of the circuits of FIG. 3.

"Reset in" input at 45, is negative "true" and goes "low" when the apparatus is turned on. This resets all the counters to zero. When a document is detected the counters start to count the 2200 lines.

The "$\phi X$ in" input 46 is a pulse from the timing reference circuitry 2 of FIG. 1 (also the output at 36 in FIG. 2). This is a start pulse that initiates a scan for the CCD sensor. That is used as a clock input to counter units 47, 48 and 49 of FIG. 3. These may be 74LS161 counter units.

Three input NAND gate 50 requires all three inputs to be positive ("true") for there to be an output. It must have a positive "video in" and "start in" (previously defined), also a time elapsed since the last "data enable" signal, in order for there to be an output. The output initiates the rest of the circuitry of FIG. 3.

The time delay is accomplished by the RC time constant circuit in the collector of transistor 51, of npn type. Capacitor 52 is connected from collector to ground. It is to have a capacitance of approximately 33 microfarads (mfd). Resistor 53 is connected from the collector to a power supply voltage, which is a signal ground, and is to have a resistance of approximately 56,000 ohms. This Provides a relatively long time delay of approximately 0.3 second. The collector of transistor 51 is also connected to the third input of NAND gate 50.

The signal delayed is the trailing edge of "data enable in" 43, which passes through inverter 54, a 74SO4, and isolation resistor 55, to the base of transistor 51.

The time delay serves an important practical role in the operation of the camera. The circuits are necessarily arranged to start a full scanning sequence of 2200 lines when the CCD sensor sees white. This handles the usual 11 inch (28 cm) long documents satisfactorily, one after the other. However, should a 14 inch (36 cm) long document be inserted in the field of view of the camera, a second 2200 line scan would be started as soon as the first one was completed because the camera would still be seeing white. This would cause a malfunction; i.e., whole 2200 line scanned documents would not be delivered. The same situation would obtain if there was a small piece of white paper, or the equivalent, present after the scanning of a 28 cm valid document.

With the time delay circuit 51, 52 and 53 operative, the camera, in effect, ignores any white suffix after the 2200 line scanning of a valid document, and white is not "seen" again until a new document has been moved into place for normal scanning.

In FIG. 3 the output of NAND gate 50 is inverted in polarity by inverter 57, which may be a 74S04. This output is fed into the J terminal of JK flip-flop 58, a 74LS107. The three conditions having been met at NAND gate 50, flip-flop 58 is set and operative. The Q output therefrom is of positive polarity, and enters a second three-input NAND gate 59. If flip-flop 58 is +, "true", the next $\phi X$ pulse that comes to the input of gate 59 will produce an output therefrom. This will initiate counters 47, 48 and 49.

Both NAND gates 50 and 59 may be the 74LS10 type.

The output of gate 59 passes to the L inputs of each of counter units 47, 48 and 49 to initiate the count.

The output of gate 59 is also inverted by 74S04 inverter 60 and fed to the J input of J-K flip-flop 61. This flip-flop is active, with "true" outputs, during the counting period. The $\overline{Q}$ output constitutes one of three inputs to NAND gate 59. This prevents restarting counters 47, 48 and 49 during the scanning of a document by preventing multiple L inputs.

The third input is the $\phi X$ from input 46, which activates the output of NAND gate 59.

The Q output of flip-flop 61 is connected to the D input terminal of D flip-flop 62. The $\overline{Q}$ output thereof is the "data enable" signal of FIG. 3, which becomes output 8 of block 7 in FIG. 1. The "data enable" output is negative "true".

The timing of the output is established by the "video valid" signal 40 coming into the clock input of D flip-flop 62.

Clocking for the counter units 47, 48 and 49 is provided by the $\phi X$ input 46, which is inverted by 74S04 inverter 63 and then supplied to the clock input of each of these units. These units are otherwise connected in cascade to accomplish the 2200 count.

"Reset in" pulse 45 enters each reset terminal of the counting units and also to the reset (R) terminal of flip-flop 61. The RCO output of the last counter unit 49 passes through inverter 64 to the reset terminal R of flip-flop 58, and through inverter 65 to the reset terminal of flip-flop 62. These inverters may be of the 74S04 type.

Counter units 47, 48 and 49 are set to give a particular count by the digital value given to the "A, B, C and D" terminals of each. For the 2200 count these values are 1,1,1,0; 0,1,1,0; and 1,1,1,0, respectively. The camera may be set up for a different count, thus more or fewer lines per document, by changing these values according to the instruction sheet of the manufacturer of the counting units.

The camera of this invention is operable over a relatively very wide range of operating speeds. The values heretofore given are preferred for typical circumstances; i.e., an oscillator 14 frequency of 18 Mhz. Since the CCD scanning circuit and other circuits in this camera are essentially aperiodic the 18 Mhz frequency can be altered.

The 18 Mhz frequency is desirable where the digital video output is to be used in a time-dependent operation; where the objective is to accomplish any process in the shortest possible time interval. With present-day technology this frequency can be increased about 100% for increased speed of operation.

Contra, a significant reduction of the operating frequency may be desired when the maximum speed of the user terminal equipment is limited.

Should a user device be employed for the storage of the video signals, such as a magnetic disk recorder having an upper data limit of 4½ Megabits, then the oscillator frequency of element 14 may be reduced to 9 Mhz by substituting a lower frequency piezoelectric crystal therein. Such a 50% frequency reduction can usually be accomplished without any adjustments being required in any of the other parts of the camera apparatus, or with only minor adjustments.

It is possible to operate the camera with a 2 Mhz, or even a 1 Mhz oscillator frequency. Such a low frequency would be desirable for driving an electrostatic printer, or equivalent device. This situation would require some change of circuit element values, such as the time delay generating components 52 and 53 of FIG. 3.

Hereinbefore, white has been the predetermined luminance for starting the scanning of a document. Typically, the document table associated with the camera is black and document paper is white. Should it be desired to scan black documents, such as negative films, the table would be made white and the circuit polarities reversed in the camera, to give operation under the opposite conditions.

In either circumstance the subject matter has a relative luminance that differs substantially from that of the background.

I claim:
1. The method of actuating an electronic-scanning camera that includes the method steps of;
   (a) Enabling actuation by the presence of an electrical signal,
   (b) thereafter starting to count scanning lines upon the camera first optically sensing subject matter having a predetermined relative luminance, and
   (c) concluding the count of scanning lines after a selected number of scanning lines have been counted,
   with concomitant cessation of the camera output.
2. The method of claim 1, in which;
   (a) the subject matter has a relative luminance differing substantially from that of the background.
3. The method of claim 2, in which;
   (a) the relative luminance of the subject matter is low, and
   (b) the relative luminance of the background is high.
4. The method of claim 2, in which;
   (a) the relative luminance of the subject matter is high, and
   (b) the relative luminance of the background is low.
5. The method of claim 1, in which;
   (a) a time delay is interposed after the cessation of the camera output before the camera can again provide an output.
6. An electronic-scanning camera circuit, having only one charge-coupled photoelectric device (1), and a source of multimegahertz electrical oscillations (14), comprising;
   (a) pulse amplifier means (24,24') connected to said source of electrical oscillations and to said photoelectric device to electrically accomplish multimegahertz scanning by said photoelectric device,

(b) a counter (30,31,32) connected to said source of electrical oscillations, and to said pulse amplifier means, and (c) means (2,35) to initiate and maintain counting by said counter only when a document is present at said photoelectric device, so that said photoelectric device output is accepted from said camera circuit only for a period of time determined by the count of said counter.

7. The camera circuit of claim 6, in which said pulse amplifier means (24,24') comprises;

(a) a first pulse buffer amplifier (24) having a frequency bandwidth extending to approximately seventy megahertz and an output impedance of approximately two ohms, with an "on", "off" transistor (20) feed, (b) An output connection from said first pulse buffer amplifier to one part of said charge-coupled photoelectric device (1) for the scanning actuation thereof, (c) a second pulse buffer amplifier (24') having a frequency bandwidth extending to approximately seventy megahertz and an output impedance of approximately two ohms, with an "on", "off" transistor (20') feed, and (d) an output connection from said second pulse buffer amplifier to another part of said charge-coupled photoelectric device (1) for the scanning actuation thereof.

8. The pulse amplifier means of claim 7, in which said "on", "off" transistor feed comprises;

(a) means (19,21) to drive the base of said transistor with an electrical pulse, and (b) a plural resistor (22,23) circuit connected between the collector of said transistor and the input to said pulse buffer amplifier to drive the same.

9. The camera circuit of claim 6, which additionally includes a time-constant circuit comprising;

(a) a resistive (53) - capacitive (52) time-constant combination, (b) means to electrically energize said combination, and (c) gate means (59) connected to said combination and to said means (46) to initiate counting by said counter, to effect a delay between the termination of a count and the initiation of a succeeding count.

10. The time-constant circuit of claim 9, in which;

(a) said resistive - capacitive combination is a resistor (53) and a capacitor (52) in signal parallel, (b) said means to electrically energize said combination is a transistor (51), the collector of which is connected to said combination, and (c) said gate means is a NAND gate (59).

* * * * *